INVENTORS
TETSUTARO YASUDA
AND
TSUNEO NAKANISHI

BY Craig, Antonelli, Stewart & Hill

ATTORNEYS

United States Patent Office 3,610,083
Patented Oct. 5, 1971

3,610,083
VERTICAL SHEARING MACHINE OF THE INTER-
CHANGEABLE KNIFE ASSEMBLY TYPE
Tetutaro Yasuda and Tsuneo Nakanishi, Hitachi-shi,
Japan, assignors to Hitachi, Ltd., Tokyo, Japan
Filed Sept. 12, 1969, Ser. No. 857,422
Claims priority, application Japan, Sept. 13, 1968,
43/65,566, 43/65,567
Int. Cl. B26d 7/26
U.S. Cl. 83—390
11 Claims

ABSTRACT OF THE DISCLOSURE

A vertical shearing machine of the interchangeable knife assembly type comprising a knife assembly including a movable upper knife and a fixed lower knife mounted on respective holders and adapted to be mounted in a shearing position in a housing and removed therefrom by itself for replacement by another knife assembly. The housing is formed with an opening therethrough and the inner sides of the housing defining said opening serve as guide surfaces for the knife assembly when the latter is mounted or removed and as sliding surfaces along which the upper knife holder moves in sliding motion when a shearing operation is performed.

This invention relates to shearing machines for cutting metal sheets produced by rolling mills and other metal materials. More particularly, the invention is concerned with a vertical shearing machine of the interchangeable knife assembly type which permits to remove upper and lower knives as they are supported by respective holders from the machine in a direction normal to the path of movement of a material.

The shearing machine of this type requires to have its knife assembly changed, each time a shearing operation is performed to cut different configurations and types of material, in conformity with the configuration and type of materials to be cut. Particularly in cases where a single shearing machine is called upon to cut materials of different cross-sectional shapes of many varieties such as in strip rolling equipment, the machine is forced to remain idle while knife assemblies are changed, which results in a considerable loss in production. Therefore, a reduction in the time required for such knife changes has been earnestly desired.

However, it has hitherto been difficult to realize a reduction in the time required for such knife changes because of the fact that the upper and lower knives of the shearing machine of this type are mounted on different parts of the machine by bolts and nuts.

In a new model of the vertical shearing machine of this type such as is disclosed in U.S. Pat. No. 3,077,134 to Ronik and U.S. Ser. No. 603,867 filed by the present inventors, now Pat. No. 3,460,423, the upper and lower knives are adapted to be removed together with respective holders from the machine in a direction normal to the path of movement of a material to be cut. Such shearing machine of the interchangeable knife assembly type offers pronounced advantages over prior art machines in that the time required for changing knives can be reduced and the knife assembly may be replaced by another knife assembly outside the machine so as to thereby ensure that the replacement operation can be performed safely.

It is noted, however, that the shearing machine of the interchangeable knife assembly type disclosed in the aforementioned U.S. Patent is not without disadvantages. The most important of them is that the upper and lower knife holders are mounted in a carriage mounted separately and independently of other members in the housing so that the upper and lower knife holders are changed together with said carriage as a unit when the knives are changed. Thus, the knife holder unit to be changed has a complicated construction and an overall large size. An increase in the size of a knife holder unit results in an increase in the size of a shearing machine. This is very uneconomical particularly in the case of a shearing machine adapted to handle hot slabs in which the shearing load exceeds 2000 tons.

Moreover, such structure has sliding surfaces formed between the upper and lower knife holders and the carriage and between the carriage and the housing. The multiplicity of sliding surfaces in the machine of this type is not desirable. When the temperature of the knife holders rises to 150° C. or 250° C., misalignment of parts and an error in operation may occur due to thermal expansion or degradation of the quality of the grease. The shearing operation may be interfered with by cooling water or scale finding its way into the sliding surfaces. Increased permanent strain may be caused in the sliding surfaces by an impact load applied thereto when the cutting operation is performed, thereby making maintenance and inspection of the machine more troublesome than otherwise.

The shearing machine of the type disclosed in the aforementioned U.S. patent is of such construction that shearing lateral pressure loads applied to the upper and lower knives and directed in opposite directions are not directly borne by the housing; they are transmitted to the housing through the carriage. This produces a turning moment in the carriage and causes undue forces to be exerted on the carriage and housing, unless steps are taken to eliminate gaps between the carriage and housing.

Furthermore, the shearing machine of the type disclosed in the aforementioned U.S. patent is constructed such that the material clamp means for fixing the material in place when a cutting operation is performed and the balance cylinders for the upper and lower knife holders form a part of the shearing knife assembly together with the upper and lower knife holders so that they may be removed with the knife holders so as not to interfere with mounting and removal of the upper and lower knife holders. Such structure is very complicated in construction and the replacement of knives makes it necessary to perform the operations of connecting and disconnecting lines of high pressure fluid and removing fluid under pressure from such lines each time a knife changing operation is performed. These operations are not only hard to perform but also time consuming, thereby prolonging the time required for the overall knife changing operation.

The last but not the least important of the disadvantages of the shearing machine of the type disclosed in the aforementioned U.S. patent is that the crankshaft and the upper knife holder are connected to each other, with a cross-head provided with semi-circular bearings being interposed therebetween. This constructiion requires an undesirable multiplicity of parts, thereby inevitably increasing the overall size of the shearing machine.

Accordingly, a principal object of this invention is to provide a novel and useful vertical shearing machine of the interchangeable knife assembly type which permits to reduce the time required for changing knives and to ensure safety in performing a knife changing operation.

Another object of the invention is to provide a shearing machine of the type described which has a simple construction so that the upper and lower knife holders are mounted in and removed by themselves as a unit as a unit from the shearing machine through the opening formed through the housing and the inner sides of the housing defining the opening serve as guide surfaces when the upper and lower knife holders are mounted in or removed from the machine and as sliding surfaces when the upper knife holder is moved downwardly in performing a shearing operation.

Another object of the invention is to provide a shearing machine of the type described which is very economical both in construction and operation and which facilitates maintenance and inspection because the upper and lower knife holders mount only the upper and lower knives respectively and the material clamp means and balance cylinders are supported by an auxiliary knife holder.

Still another advantage of the invention is to provide a shearing machine of the type described in which the material clamp means is pivotally connected to the housing of the machine so that the clamp means can be pivotally moved out of the opening in the housing when the knife holders are to be changed so as not to interfere with the removal of knife holders from the machine, whereby the trouble of connecting and disconnecting high pressure fluid lines can be eliminated and the time required for changing knives can be reduced.

A further object of the invention is to provide a shearing machine of the type described which is simple in construction so that the balance cylinders for balancing the upper and lower knife holders can be lifted by spring means or fluid cylinders and moved apart from the upper and lower knife holders, whereby the trouble of connecting and disconnecting high pressure fluid lines can be eliminated and the replacement of the knives can be facilitated.

Additional objects as well as features and advantages of this invention will become evident from the description set forth hereinafter when considered in conjunction with the accompanying drawings, in which.

Figure 1:
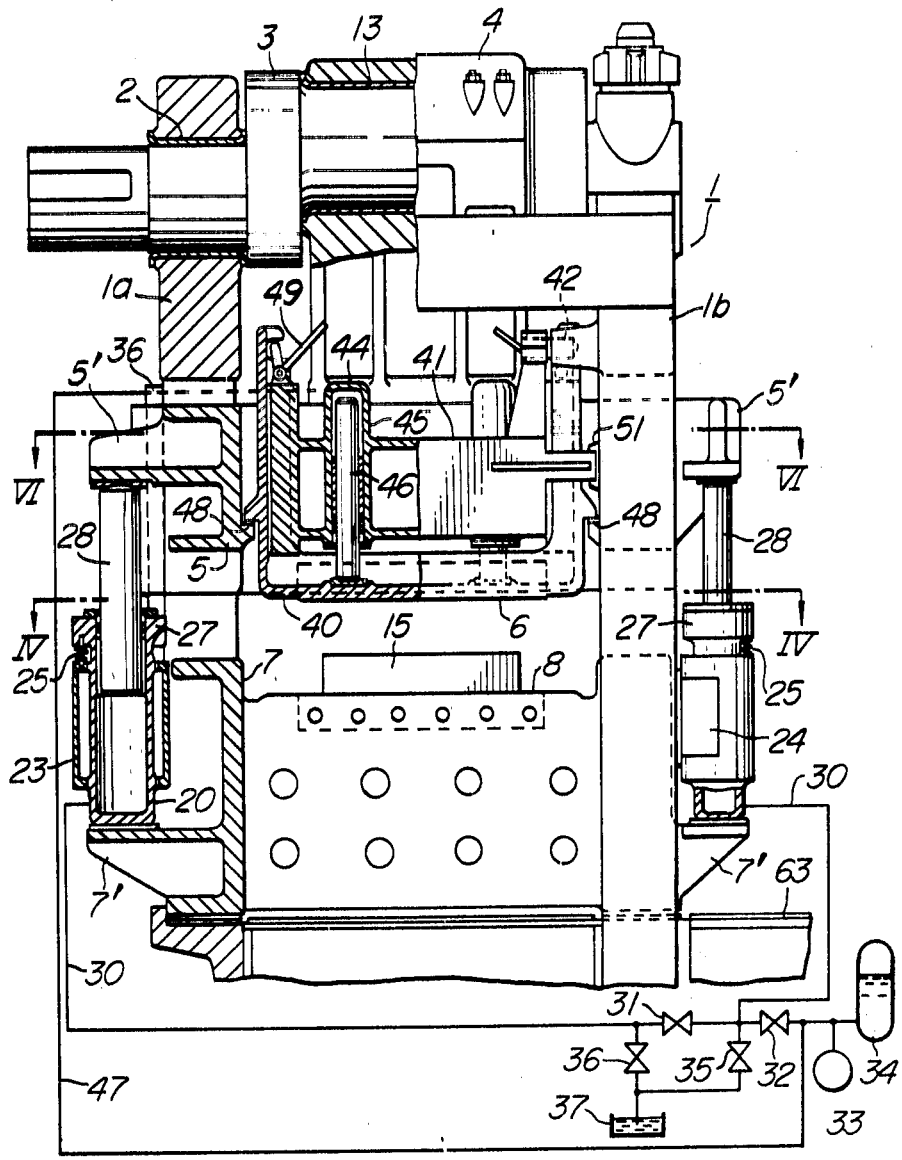
FIG. 1 is a front view of a shearing machine embodying this invention, with certain parts being broken away.

The drawings illustrate a vertical shearing machine in which a movable upper knife supported by an upper knife holder is caused to move substantially vertically by an electrically operated crank into and out of engagement with a fixed lower knife supported by a lower knife holder to cut a material. A housing 1 of the machine mounts in its upper portion a crankshaft 3 which is rotatably journalled by bearings 2. The rotation of said crankshaft 3 causes, through a connecting rod 4 attached to said crankshaft, an upper knife holder 5 supporting an upper knife 6 to move downwardly. As the upper knife holder 5 descends, the upper knife 6 and a lower knife 8 supported by a lower knife holder 7 firmly fixed to the housing 1 cut a material 15 therebetween. The upper and lower knife holders 5 and 7 only mount the upper and lower knives 6 and 8 respectively secured thereto by bolts 9 and 10 and no other attachments such as guides or carriages are mounted thereon. The knife holders and the knives supported thereby form a knife assembly which is adapted to be inserted through an opening 11 formed in the housing 1. With this arrangement, it will be appreciated that the inner sides of the housing defining the opening 11 serve as guide surfaces for the knife assembly when the matter is mounted in or removed from the machine and also as sliding surfaces along which the upper knife holder moves in sliding motion when a shearing operation is performed.

The connecting rod 4 is connected to the upper knife holder 5, with the lower end of the former being received in a semi-circular bearing 12 mounted on the upper surface of the latter. The two members are connected to and disconnected from each other by means of hydraulic balance cylinders 20, 21 and 22 mounted between the upper knife holder 5 and lower knife holder 7. The balance cylinders 20, 21 and 22 develop altogether a power which is sufficiently high to lift the upper knife holder 5 and connecting rod 4 as a unit after the completion of shearing and to resist the downwardly directed force exerted by the crankshaft 3 on the upper knife holder 5 when the latter decends to cut the material. Thus, the rate at which the upper knife holder 5 is moved upwardly by the cylinders 20, 21 and 22 is higher than the rate at which the crankshaft 3 is rotated when a cutting operation is performed. This eliminates play between the semi-circular bearing 12 in the upper knife holder 5 and the lower end of the connecting rod 4 and between the crankshaft 3 and a bearing portion 13 of the connecting rod 4 and ensures that the connecting rod 4 is positively connected to the upper knife holder 5 at all times. This is conducive to elimination of damage to the bearing portions at which the parts engage one another. The longitudinal dimension of semi-circular bearing 12 is substantially the same as the length of the knives, and the bearing 12 is engaged with the lower end of the connecting rod through substantially the entire length thereof. This is conducive to maintaining the upper knife holder 5 in a position in which it is aligned with the horizontal when it descends in cutting the material.

Figure 7:
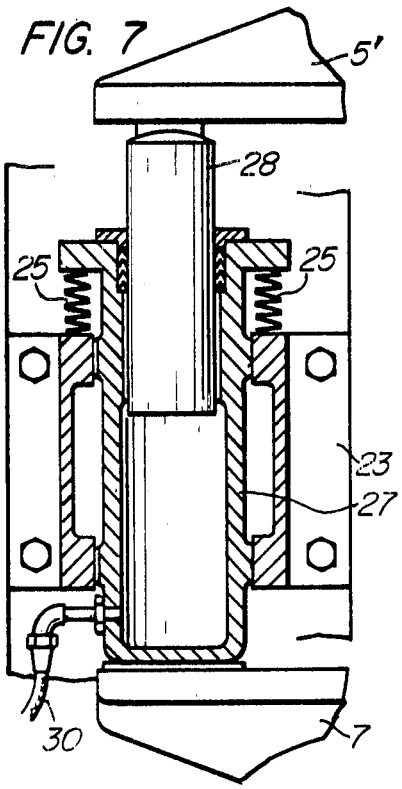
FIG. 7 is a fragmentary longitudinal sectional view of the shearing machine of this invention showing one of the balance cylinders of the spring type constructed in accordance with this invention.
Figure 8:
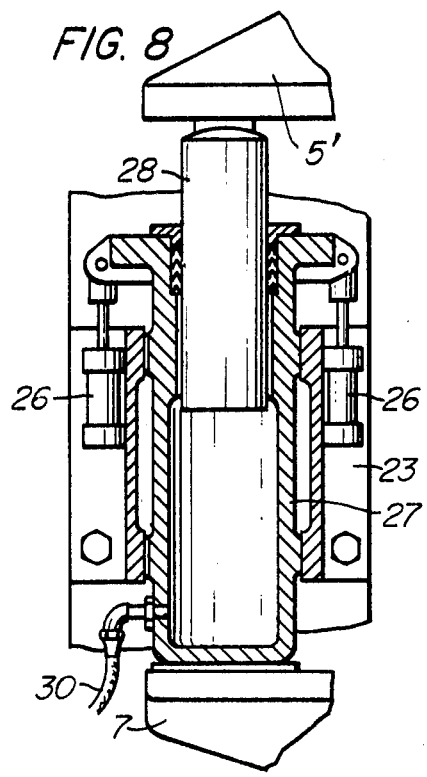
FIG. 8 is a fragmentary longitudinal sectional view of the shearing machine of this invention showing one of the balance cylinders of the fluid pressure type constructed in accordance with this invention.

The balance cylinders 20, 21 and 22 are supported by mounting members 23 and 24 and disposed outwardly of the housing 1. The balance cylinder 20 is mounted on the drive side 1a of the housing 1 and the balance cylinders 21 and 22 are mounted on the operation side 1b thereof. The provision of only one cylinder 20 on the drive side of the housing facilitates designing of the upper and lower knife holders 5 and 7 so that projections 5' and 7' formed on the holders 5 and 7 respectively have a dimension smaller than the width of the opening 11 formed in the housing 1. This dimensional relationship is an important factor in moving the projections 5' and 7' through the opening 11 when the upper and lower knife holders 5 and 7 withdrawn for effecting a knife change. The detailed arrangement and construction of the balance cylinder 20, 21 are shown in FIGS. 7 and 8. A cylindrical member 27 is supported for vertical sliding motion by a mounting member 23 secured to the housing 1. A spring 25 or hydraulic cylinder 26 is mounted between the cylindrical member 27 and the mounting member 23 so as to cause the former in sliding motion relative to the latter. A lower end of the cylindrical member 27 is positioned against the projection 7' of the lower knife holder 7 extending outwardly of the housing 1. An upper end of a rod 28 inserted in the cylindrical member 27 is positioned against the projection 5' of the upper knife holder 5 extending outwardly of the housing 1. Other balance cylinders 21 and 22 have the same construction and arrangement as the cylinder 20, so that their detailed description is omitted. It should be noted that the springs 25, or hydraulic cylinders 26 are capable of developing a power which is sufficiently high to lift the balance cylinders 20, 21 and 22 but which does not materially reduce the clamping force exerted by the balance cylinders on the lower knife holder 7. For example, in the case of a shearing machine having a shearing capacity of 2,300 tons, the output power of the springs 25 on hydraulic cylinders 26 is about 5 tons as contrasted to the output power of 120 tons developed by the balance cylinders 20, 21 and 22. Accordingly, the clamping force exerted by the balance cylinders on the lower knife holder 7 is equivalent to an output power of 115 tons.

Connected to each cylindrical member 27 is a flexible hose 30 which in turn is connected to lines, one of which is connected through valves 31 and 32 to a hydraulic pump 33 and a pressure fluid tank 34 and the other of which is connected through valves 45 and 36 to a discharged fluid tank 37, as shown in FIG. 1. When a cutting operation is performed, the valves 31 and 32 are opened and the valves 35 and 36 are closed so as to connect the balance cylinders 20, 21 and 22 to the pressure fluid tank 34. Thus, fluid under pressure is introduced into the cylindrical members 27 to move the cylinder rods 28 upwardly to thereby push the projections 5' of the upper knife holder 5. On the other hand, the cylindrical members are 27 moved downwardly by reaction to push the projections 7' of the lower knife holder 7 against the biasing force of the springs 25 or hydraulic cylinders 26 so as to thereby clamp the lower knife holder 7 to the housing 1. Thus, it will be appreciated that the balance cylinders 20, 21 and 22, when fluid under pressure is introduced thereinto, function both as balance cylinders for preventing damage which might otherwise be caused to the bearings and other parts and as clamp cylinders for positioning the upper knife holder 5 in the opening 11 with respect to the vertical axis of the housing 1.

The material clamp means according to this invention will be explained. The material clamp means according to this invention is designed and constructed such that it is disposed as near to the knives as possible so as to prevent bending of the material when cutting is effected and yet it does not interfere with the withdrawal of the upper and lower knife holders from the housing when a knife change is effected without requiring to disconnect the high pressure lines. More specifically, the clamp means includes a frame 41 supporting a material hold-down member 40 capable of vertical sliding motion relative to said frame. The frame 41 is pivotally connected to the housing 1 by pivot pins 42 on the inner sides of the housing. Said frame 41 is connected to a hydraulic cylinder 43 which is mounted on the housing 1 for moving the frame 41 in pivotal motion, so that the frame 41 is disposed near to the upper knife holder 5 when cutting is effected but pivotally moved out of the opening 11 when the upper and lower knife holders are removed from the shearing machine. The clamp means also comprises a clamp cylinder 44 having a cylindrical member 45 connected to said frame so as to cause the material hold-down member 40 by a cylinder rod 46 to move downwardly in sliding motion relative to the frame 41. The clamp cylinder 44 is connected to the pressure fluid pump 33 and pressure fluid tank 34 through a line 47 so as to keep a cylinder rod 46 in a lower position at all times. The downward movement of the material hold-down member 40 is restricted by a stopper 48 attached to the upper knife holder 5. A lock 49 is provided in the upper portion of the frame 41 to ensure that the material hold-down member 40 is retained by the frame 41 when the upper and lower knife holders are removed from the shearing machine in effecting a knife change. The clamping force exerted by the clamp cylinder 44 on the upper knife holder 5 acts to move the latter downwardly. Since the output power of the clamp cylinder 44 is added to the output power of the balance cylinders 20, 21 and 22, the upper knife holder 5 moves substantially vertically in synchronism with the material keep-down member 40 while being maintained in contact with the connecting rod 4 when a cutting operation is performed.

When cutting is effected, the material hold-down member 40 first comes into contact with the material and clamps the same. Then, the upper knife holder 5 descends to complete cutting. At this time, the stopper 48 is spaced apart from the material keep-down member 40.

Figure 2:
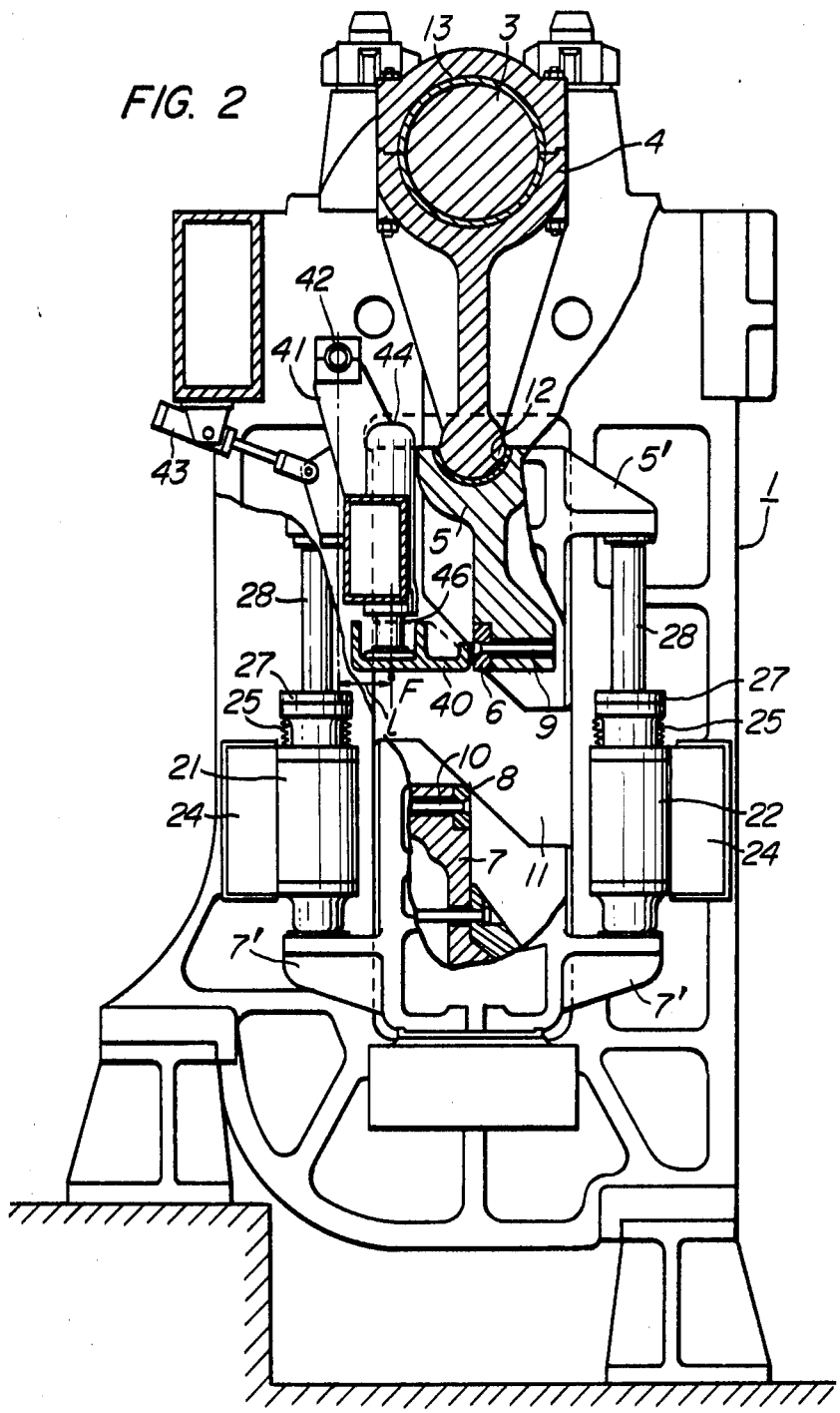
FIG. 2 is a side view of the shearing machine of FIG. 1, with certain parts being broken away.
Figure 6:
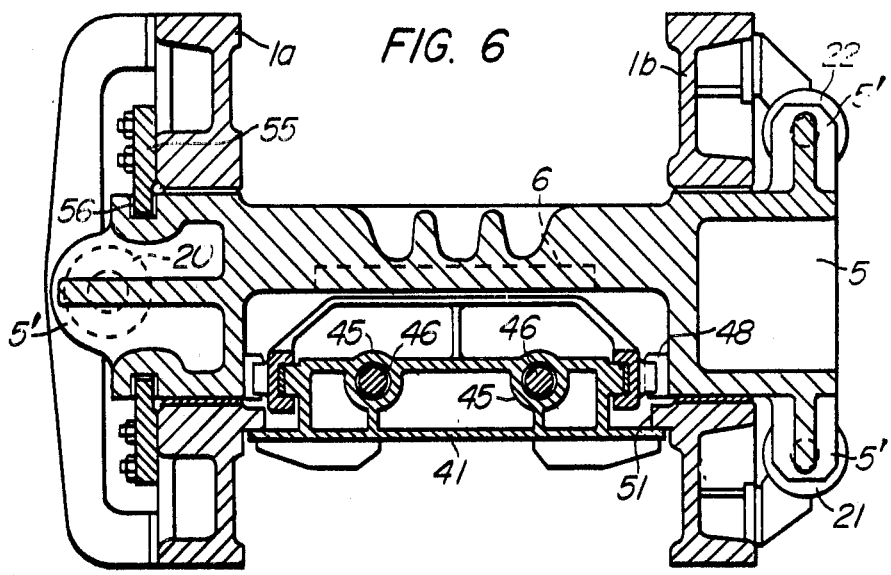
FIG. 6 is a view seen in the direction of the arrow VI—VI of FIG. 1.

Upon completion of cutting, the upper knife holder 5 moves upwardly and the stopper 48 is brought into engagement with the material keep-down member 40 again, so that they move upwardly as a unit thereafter. The material clamp means is pivoted at 50 which is displaced from the center of clamp cylinder 44 by a distance $l$ as shown in FIG. 2. When the clamping force (about 40 tons) is exerted on the frame 41, a moment F1 is imparted to the frame 41. This turning moment imparted to the frame 41 is borne by stoppers 51 attached to the housing 1 as shown in FIG. 6. This arrangement permits to control the movement of the frame 41 without relying on the pivotal force exerted by the hydraulic cylinder 43.

Thus, it will be appreciated that the hydraulic cylinder 43 may be of small diameter.

When the material is cut, the upper knife holder 5 tends to be subjected to a longitudinally directed thrust because the height of the material across the width thereof is not necessarily uniform. This thrust is borne by thrust bearing plates 55 shown in FIG. 4. Said thrust bearing plates 55 are only provided on the drive side of the housing and adapted to be received in vertical grooves 56 formed in one edge of the upper knife holder 5 to guide the vertical movement of the upper knife holder 5 when cutting is effected. The thrust bearing plates 55 can be moved by opening and closing cylinders 59 to shift their positions as shown by the arrows S in FIG. 4, with slots 67 formed in the plates 55 being guided by bolts 58 connected to the housing 1 on its drive side. It is customary that the thrust bearing plates of this type are mounted both on the drive side and the operation side of the housing. In the shearing machine according to this invention, however, the thrust bearing plates are only mounted on the drive side as aforementioned because of the arrangement that the semi-circular bearing 12 extends for a sufficiently great distance longitudinally of the shearing machine to control the horizontal position of the upper knife holder 5. The provision of the thrust bearing plates both on the drive side and operation side of the housing is not only uneconomical but also has a disadvantage in that since various parts of the machine undergo substantial heat expansion particularly in the case of a shearing machine adapted to cut hot slabs, it is very difficult to select optimum spacing between the thrust plates and upper knife holder.

Figure 4:
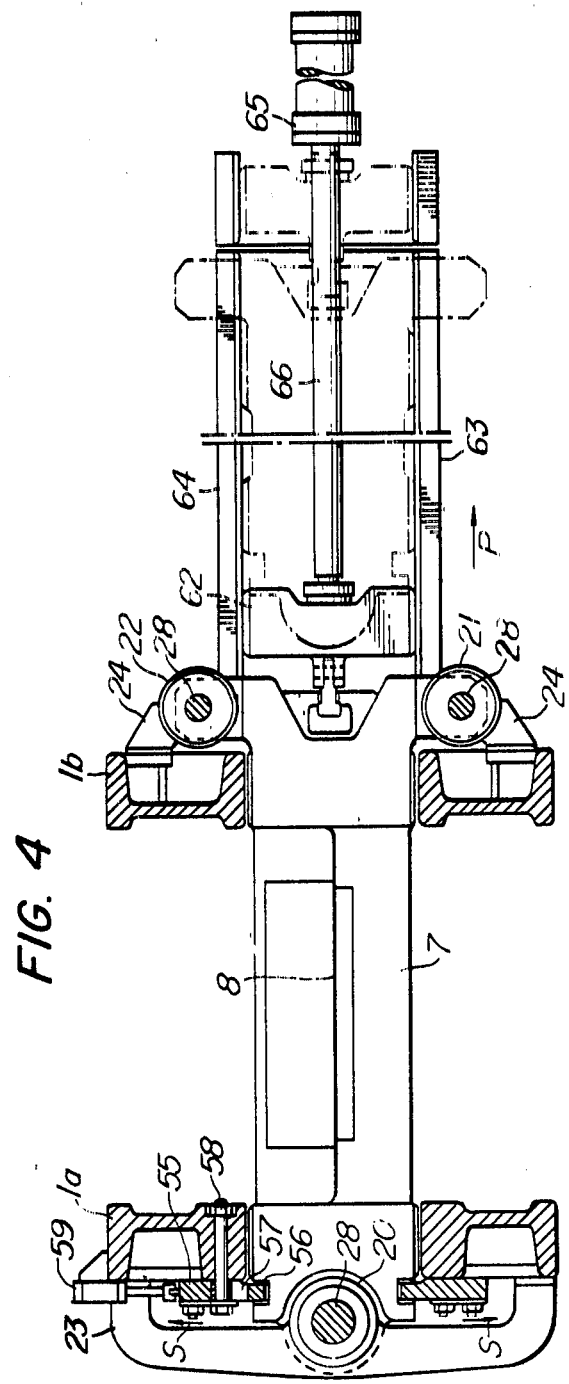
FIG. 4 is a view as seen in the direction of the arrow IV—IV of FIG. 1.
Figure 5:
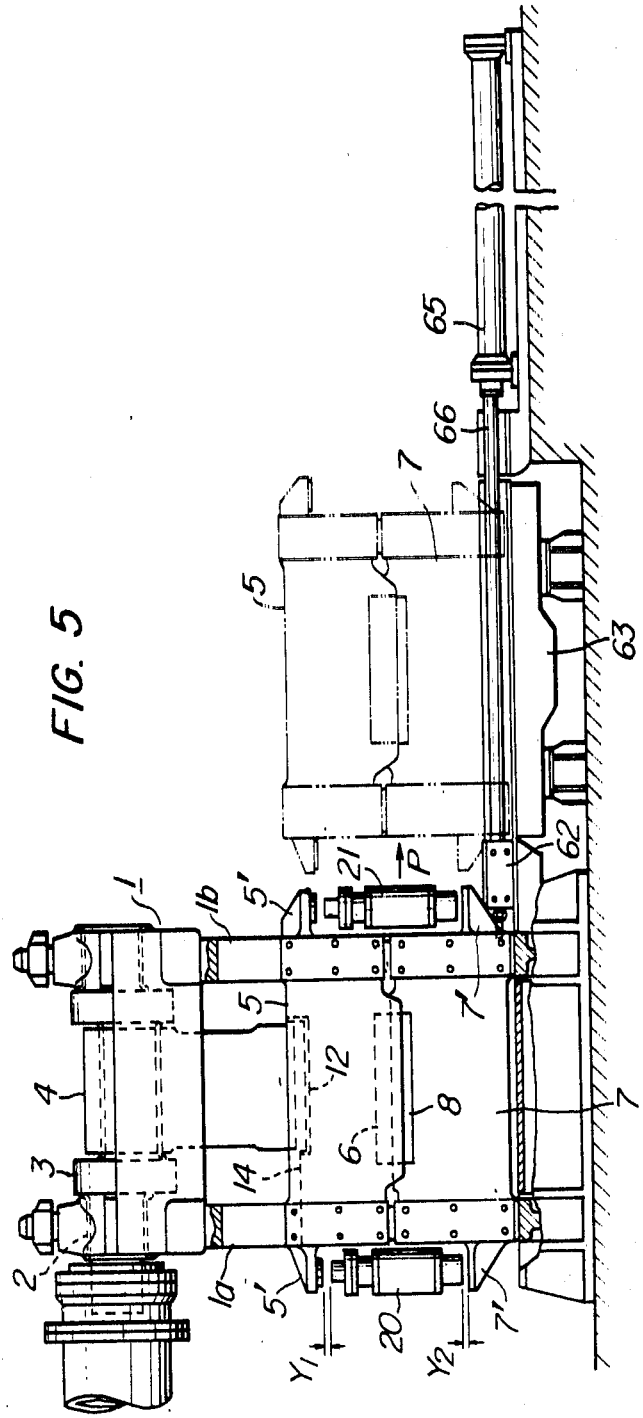
FIG. 5 is a front view of the shearing machine according to this invention showing the manner in which upper and lower knife holders are removed from the machine as a unit to be replaced by another set of upper and lower knife holders.

FIGS. 4 and 5 show knife changing means that can be used when knife changes are effected. A connecting rod 60 is adapted to be connected to the lower knife holder 7 when the upper and lower knife holders are withdrawn from the shearing machine through the openings 11 in a direction normal to the path of movement of the material. The connecting rod 60 is rotatably connected to a pin 61 attached to a guide sled 62 which is connected to a piston rod 66 of a knife changing cylinder 65 for movement to right and left as seen in FIGS. 4 and 5 on a support base 63 while being guided by side walls 63 of the latter.

The manner in which the upper and lower knife holders are changed will now be explained. The material keep-down member 40 which is in its uppermost position as the crankshaft 3 is in its upper dead position is connected to the frame 41 by the lock 49 to preclude its vertical movement. Then, the crankshaft 3 is rotated to bring it downwardly to its lower dead position. This causes the upper knife holder 5 to move downwardly while the material hold-down member 40 remains in its uppermost position. In this state, the upper knife holder 5 is disconnected from the frame 41, so that the pivotal cylinder 43 is operated to pivotally move the material clamp means out of the opening 11. This leaves the upper and lower knife holders 5 and 7 free to move without any interference through the opening 11 out of the shearing machine in a direction normal to the path of movement of the material.

On the other hand, the valves 31 and 32 are closed and the valves 35 and 36 are opened to remove fluid under pressure from the cylindrical members 27 of the balance cylinders 20, 21 and 22. This causes the upper knife holder 5 to move downwardly by its own weight below the lowermost position it assumes in the cutting operation till it is superimposed on the lower knife holder 7 through the stopper.

At this time, it is required to manipulate the valves 35 and 36 in such a manner that the upper knife holder 5 may descend slowly so as to ensure that it moves downwardly while maintained accurately horizontally. As the upper knife holder 5 moves downwardly, the cylinder rods 28 move downwardly till a clearance Y2 is formed between the upper end of the cylinder rods 28 and the projections 5' of the upper knife holder 5. At the same time, the cylindrical members 27 are moved slightly upwardly by the springs 25 or hydraulic cylinders 26 till a clearance Y1 is formed between the lower ends of the cylindrical members 27 and the projections 7' of the lower knife holder (see FIG. 3). Preferably, these clearances are maintained at about 10 millimeters for the smooth performance of a knife changing operation.

Upon completion of the aforementioned operation, the thrust bearing plates 55 are removed in opposite directions as shown by the arrow S by means of the opening and closing cylinders 59. Then, the connecting rod 60 of the changing means is connected to the lower knife holder 7 and the changing cylinder 65 is actuated so as to withdraw only the upper and lower knife holders 5 and 7 mounting the upper and lower knives respectively through the opening 11 in a direction normal to the path of movement of the material as shown by the arrow P in FIG. 4.

Figure 3:
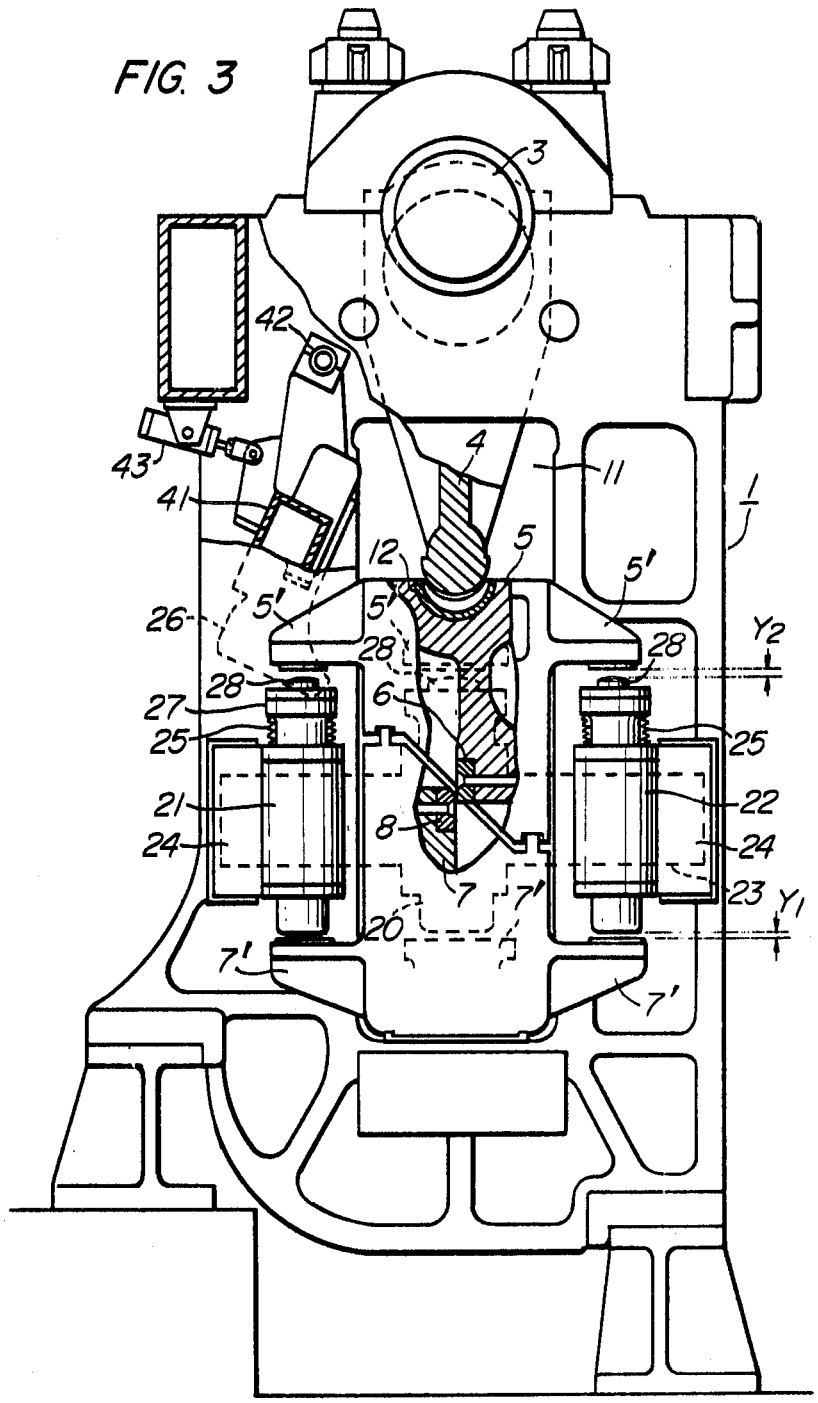
FIG. 3 is a side view of the shearing machine of FIG. 1, with certain parts being broken away, showing the manner in which upper and lower knife holders are changed.

As shown in FIGS. 3 and 5, a cutout 14 is formed in the semi-circular bearing 12 so as to preclude contact between the upper end of the upper knife holder 5 and the connecting rod when the upper and lower knife holders are removed from the machine.

From the foregoing description, it will be appreciated that the vertical shearing machine of the interchangeable knife type according to this invention permits to withdraw only the upper and lower knife holders mounting the upper and lower knives respectively from the machine while leaving the balance cylinders and material clamp means within the machine.

What we claim is:

1. A vertical shearing machine for cutting a metal material, comprising an upright housing formed with an opening therethrough; a source of fluid under pressure; a knife assembly movable from a position in said housing outwardly thereof through said opening, said assembly including an upper knife holder mounted in said housing for substantially vertical movement, an upper knife secured tho said upper knife holder, a lower knife holder, and a lower knife firmly fixed to said lower knife holder for cooperation with said upper knife; operating means on said housing for actuating said upper knife holder; balance cylinders connectible to said source of fluid under pressure; a material clamp means mounted in said housing for clamping a material to be cut, and knife changing means adapted to be connected to said lower knife holder for withdrawing said knife assembly from said housing when a knife change is effected; said knife assembly being adapted to be mounted in and removed from said housing through said opening as a unit so that the inner sides of the housing defining said opening serving as guide surfaces for the assembly when the latter is mounted or removed and as sliding surfaces along which the upper knife holder moves in sliding motion when a shearing operation is performed, and said balance cylinders for said upper and lower knife holders and said material clamp means being mounted on the housing for cooperation with the upper knife holder when a shearing operation is performed and remaining within the housing when said assembly is removed from the machine to be changed with another assembly.

2. A vertical shearing machine as defined in claim 1 in which said balance cylinders each include a cylindrical member and a cylinder rod received in said cylindrical member for exerting a bolstering force on said upper and lower knife holders, and said cylindrical members are mounted for substantially vertical movement on mounting members secured to said housing so that said cylindrical members and said cylinder rods can be disconnected and separated from the upper and lower knife holders when said knife assembly is removed from the machine to be replaced by another knife assembly.

3. A vertical shearing machine as defined in claim 2 in which said balance cylinders are mounted on said mounting members which are disposed outwardly of said housing, and said upper and lower knife holders are formed with projections respectively which extend outwardly of said housing.

4. A vertical shearing machine as defined in claim 3 in which said balance cylinders are three in number, one of said balance cylinders being disposed on the drive side of said housing and two of said balance cylinders being disposed on the operation side thereof.

5. A vertical shearing machine as defined in claim 4 in which said operating means include a connecting rod, said balance cylinders are capable of developing altogether a power which is sufficiently high to lift said upper knife holder and said connecting rod, and said upper knife holder is is adapted to be moved upwardly in its substantially vertical movement by said balance cylinders.

6. A vertical shearing machine as defined in claim 5 in which said connecting rod is connected to said upper knife holder through a semi-circular bearing having a longitudinal dimension substantially similar to the length of the knives.

7. A vertical shearing machine as defined in claim 1 in which said material clamp means is pivotally mounted on said housing, said clamp means being disposed in said opening in said housing near to the material to be cut when cutting is effected and pivotally moved out of said opening by the operation of a hydraulic shifter to clear the way for said knife assembly when it is removed from the machine through said opening to be replaced by another knife assembly.

8. A vertical shearing machine as defined in claim 7 in which said material clamp means comprises a frame adapted to be moved in pivotal motion by said hydraulic shifter, a material hold-down member capable of substantially vertical movement relative to said frame, and a clamp cylinder for urging said material hold-down member downwardly at all times.

9. A vertical shearing machine as defined in claim 8 in which said frame is pivotally mounted on a shaft disposed outwardly of said housing, and said frame mounting shaft is displaced outwardly of the clamp cylinder, whereby a turning force produced in said frame when the material is cut can be caused to act in a direction opposite to the direction in which said frame is moved in pivotal motion by said hydraulic shifter.

10. A vertical shearing machine as defined in claim 9 in which said material keep-down member which is adapted to be moved downwardly by said clamp cylinder is mounted such that it can move in substantially vertical movement in synchronism with the substantially vertical movement of said upper knife holder and the extent of its downward movement is restricted by said upper knife holder.

11. A vertical shearing machine as defined in claim 1 which further comprises thrust bearing plates only mounted on the drive side of the housing to bear a longitudinally directed thrust produced in said upper knife holder, said thrust bearing plates being adapted to be moved in and out of position by opening and closing cylinders.

References Cited

UNITED STATES PATENTS

| | | | |
|---|---|---|---|
| 3,077,134 | 2/1963 | Ronick | 83—563 X |
| 3,460,423 | 8/1969 | Hayash | 83—563 X |

JAMES M. MEISTER, Primary Examiner

U.S. Cl. X.R.

83—466, 563, 615, 698